May 27, 1952  G. A. LYON  2,597,881
WHEEL COVER STRUCTURE
Filed Sept. 30, 1947

Inventor
GEORGE ALBERT LYON

Patented May 27, 1952

2,597,881

UNITED STATES PATENT OFFICE 2,597,881

WHEEL COVER STRUCTURE

George Albert Lyon, Detroit, Mich.

Application September 30, 1947, Serial No. 776,972

7 Claims. (Cl. 301—37)

This invention relates to improvements in wheel cover structures and more particularly to a novel cover adapted to be applied to the outer side of a vehicle wheel.

An important object of the present invention is to provide an improved wheel cover structure which is adapted to be utilized as a hub cap or as a cover for a larger area of a vehicle wheel than is ordinarily enclosed by a hub cap.

Another object of the invention is to provide a novel wheel cover in which an improved reinforced annular shoulder is provided on the cover.

A further object of the invention is to provide an improved generally dish-shaped wheel cover having a novel flexible, reinforced marginal construction.

It is also an object of the invention to provide in a wheel cover a novel marginal name plate construction.

According to the general features of the present invention, there is provided a generally dished cover for use on a vehicle wheel or the like, the cover having a central crown portion bounded by a relatively large radius reinforcing rib merging with a generally axially directed marginal annular flange formed at its extremity with a reinforcing and cover retaining turned bead and having an intermediate annular reinforcing rib formation.

According to other features of the invention, the cover marginal flange is reinforced by a bead member which retainingly engages the intermediate rib of the flange.

According to another feature of the invention the cover is reinforced by an externally applied reinforcing ring member having a portion thereof overlapping the marginal bead about the crown and extending generally axially in reinforcing relation to the marginal flange of the cover.

According to other general features of the invention there is provided a wheel cover having a crown portion and an annular area at the margin of the crown portion overlapped by an ornamenting and reinforcing bead, said bead having openings therethrough exposing the overlapped portion of the crown margin.

Figure 1:
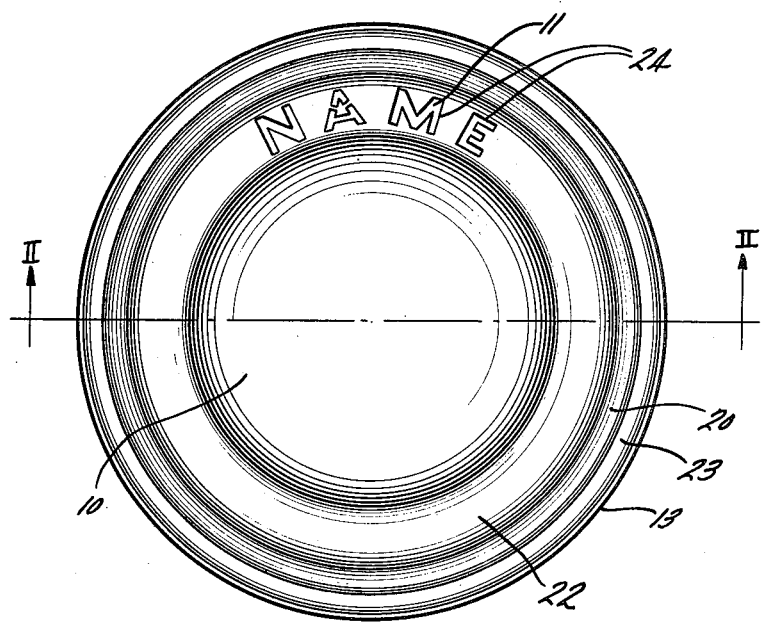
Figure 2:
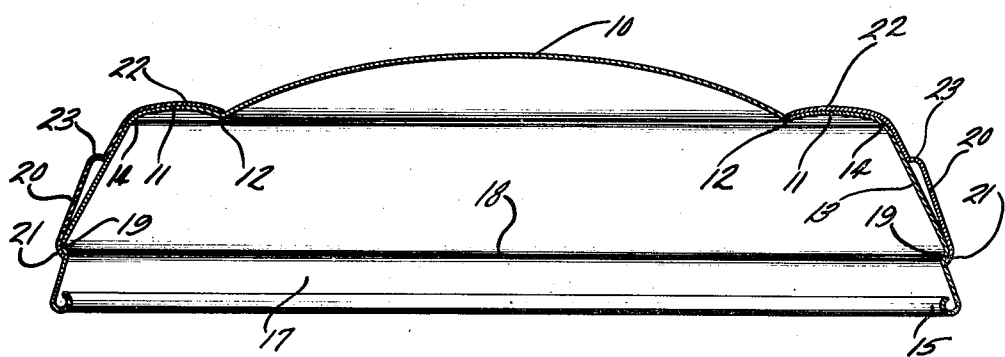

Other objects, features and advantages of the present invention will be readily apparent from following detailed description of a preferred embodiment thereof taken in conjunction with the accompanying drawings, in which:

Figure 1 is a side elevational view of a wheel cover embodying features of the invention; and Figure 2 is a diametric sectional view taken substantially on the line II—II of Figure 1.

As shown on the drawings:

The wheel cover comprises a crown 10 which may be of convex form and is bounded by a marginal portion 11 affording a reinforcing rib of relatively large radius joined to the central crown portion along an annular indentation 12 providing a counter-rib, and merging with a generally axially extending marginal flange 13. In the present instance the flange 13 is formed of substantial depth and generally frusto-conical in shape, that is tapering from a juncture shoulder 14 with the marginal rib 11 to a terminal reinforcing, inwardly curled bead 15. The cover is adapted to be made from relatively thin sheet metal and the bead 15 stiffens and thereby affords a relatively strong resiliency for the edge of the cover and adapts the cover to be applied to the wheel by engagement with retaining means such as the rigid bumps (not shown) with which the bead 15 will engage with a strong resilient grip.

Spaced from the beaded terminal 15 of the flange 13 a sufficient distance to leave a free flexing annular portion 17, is a stiffening rib 18 which affords an annular undercut shoulder 19 on the flange 13 facing generally axially and spaced from the extremity of the cover side flange a shorter distance than the spacing from the juncture shoulder 14, said spacing being such that the portion 17 comprises approximately the terminal third of the flange 13.

The major portion of the flange 13 is reinforced, ornamented and protected by an annular member or bead 20 which encircles the same and has an underturned retaining flange 21 engaging the shoulder 19. The member 20 is preferably of an extent and formation to encompass the marginal rib 11 and for this purpose having a flange portion 22 contoured complementary to the rib 11 to lie snugly thereagainst, with the extremity of the portion 22 received in the groove 12 and the juncture thereof with the remainder of the member 20 bearing against the shoulder 14.

Intermediately the member 20 is preferably formed with an outwardly bulging annular shoulder 23 offsetting the portion between such shoulder and the retaining flange 21 slightly from the adjacent surface of the cover flange 13 and serving as a buffer.

Not only does the bead member provide a stiffening reinforcement for the flange 13 of the cover but it also affords an ornamental trim for the cover. For ornamental purposes the exterior of the cover 10 and the external surface of the bead member 20 may be contrastingly finished, as by having the cover proper finished in a suitable color shade while the bead member 20 presents a polished metal surface. For example, the bead member 20 may be formed of stainless steel and the surface thereof given a lustrous finishd.

Another use for the marginal overlapping bead portion 22 is as a name plate. To this end a preferred name, such as the name of a make of automobile or of a manufacturer is adapted to be cut in the portion 22 substantially as indicated at 24 in Figure 1. Thereby the underlying outer surface of the marginal rib 11 is exposed through the name cutouts. Where the surface of the bead portion 22 is of a contrasting finish to the exposed surface of the rib 11, the name will appear quite prominent. Since the bead portion 22 lies snug against the surface of the rib 11 there will be little chance for dirt or moisture to enter between the members and should some moisture infiltrate, centrifugal force in operation of the wheel to which the cover is applied will tend to drive out such moisture through the openings provided by the name cutouts.

I claim as my invention:

1. A generally dished cover for use on a vehicle wheel or the like, the cover having a central crown portion bounded by a reinforcing rib merging with a generally axially directed marginal annular flange formed at its extremity with a reinforcing and cover retaining turned bead and having an intermediate annular reinforcing rib formation, the cover marginal flange being reinforced by a bead member which retainingly engages the intermediate rib of the flange.

2. A generally dished cover for use on a vehicle wheel or the like, the cover having a central crown portion bounded by a reinforcing rib merging with a generally axially directed marginal annular flange formed at its extremity with a reinforcing and cover retaining turned bead and having an intermediate annular reinforcing rib formation, the cover being reinforced by an externally applied reinforcing ring member having a portion thereof overlapping the marginal rib about the crown and extending generally axially in reinforcing relation to the marginal flange of the cover.

3. In combination in a wheel cover of the character described, a main cover member including a crown and a generally axially extending rim flange structure, and a buffer bead member encompassing at least a portion of said rim flange structure, said flange structure having radially projecting bead-retaining means intermediate the margins of said flange structure retainingly engaged by said bead member.

4. In combination in a wheel cover of the character described, a main cover member including a crown and a generally frusto-conically extending rim flange structure, and a buffer trim member of generally L-shape cross section having one leg portion encompassing at least a portion of said rim flange structure and a second leg portion enveloping the margin of said crown portion, said flange structure having a radially projecting trim-member-retaining means intermediate the margins of said flange structure retainingly engaged by said trim member.

5. In combination in a vehicle wheel cover of the character described, a generally dished cover member having a marginal flange with the edge thereof beaded for reinforcement and cover retaining resiliency, a shoulder protruding from said margin and facing generally toward the margin extremity, said shoulder being spaced a substantial distance from said beaded extremity, and a reinforcing and ornamental member encircling said flange on the opposite side of said shoulder from the flange extremity and having a marginal portion in retaining engagement with said shoulder, said encircling member extending over a marginal portion of the crown adjacent to said flange and having an intermediate portion offset and providing a buffer area spaced outwardly from the adjacent area of the flange.

6. In combination in a wheel cover structure of the hub cap type, a main cover member comprising a crown portion and a generally frusto-conical side portion terminating in a reinforced edge, the crown portion having an annular indentation adjacent to juncture with the side portion, the side portion having an annular indentation adjacent to said edge, and a reinforcing and buffer annulus of generally L-shaped cross section having its opposite edges retainingly engaging in respectively said crown indentation and said side portion indentation and providing a protective buffer for the areas of the crown portion and the side portion intermediate said indentations.

7. In combination in a wheel cover structure of the hub cap type, a main cover member comprising a crown portion and a generally frusto-conical side portion terminating in a reinforced edge, the crown portion having an annular indentation adjacent to juncture with the side portion, the side portion having an annular indentation adjacent to said edge, and a reinforcing and buffer annulus of generally L-shaped cross section having its opposite edges retainingly engaging in respectively said crown indentation and said side portion indentation and providing a protective buffer for the areas of the crown portion and the side portion intermediate said indentations, that portion of the buffer annulus covering the side portion of the main cover member having an outwardly protruding annular buffer bulge.

GEORGE ALBERT LYON.

REFERENCES CITED

The following references are of record in the file of this patent:

UNITED STATES PATENTS

| Number | Name | Date |
| --- | --- | --- |
| D. 143,497 | Lyon | Jan. 8, 1946 |
| 2,109,671 | Lyon | Mar. 1, 1938 |
| 2,368,248 | Lyon | Jan. 30, 1945 |